United States Patent [19]
Guichard

[11] Patent Number: 4,890,700
[45] Date of Patent: Jan. 2, 1990

[54] CARBON DISK BRAKE ROTOR FITTED WITH REINFORCING RIDERS

[75] Inventor: Jean Guichard, La Garenne Colombes, France

[73] Assignee: Messier-Hispano-Bugatti, Montrouge, France

[21] Appl. No.: 328,548

[22] Filed: Mar. 24, 1989

[30] Foreign Application Priority Data

Apr. 8, 1988 [FR] France ................ 88 04689

[51] Int. Cl.⁴ .............................. F16D 65/12
[52] U.S. Cl. ...................... 188/73.2; 188/218 XL
[58] Field of Search .......... 188/72.3, 218 XL, 250 B; 192/70.13, 70.14, 70.15, 107 R

[56] References Cited

U.S. PATENT DOCUMENTS 3,891,066 6/1975 Anderson ............... 188/73.2
4,083,434 4/1978 Pinter .................. 188/73.2
4,784,246 11/1988 Edmisten ............. 188/218 XL

FOREIGN PATENT DOCUMENTS 2040586 1/1971 France .
2257820 8/1975 France .
2266054 10/1975 France .
2277273 1/1976 France .

Primary Examiner—Duane A. Reger
Attorney, Agent, or Firm—Sixbey, Friedman, Leedom & Ferguson

[57] ABSTRACT

A carbon disk brake rotor (1) has n trapezium-shaped drive notches (3) around its periphery and a plurality of reinforcing riders (2), with the drive faces (6) of each notch (3) being at an angle A of (360/2n) degrees relative to the midplane (3a) of the notch, and with the riders (2) completely covering the projecting portions (7) between consecutive notches (3) which have parallel fitting faces (9).

1 Claim, 1 Drawing Sheet

CARBON DISK BRAKE ROTOR FITTED WITH REINFORCING RIDERS

The invention relates to a brake rotor, in particular for an aircraft brake, the rotor being made of carbon and fitted with reinforcing riders.

BACKGROUND OF THE INVENTION

Each of such carbon disk brate rotors includes drive notches receiving drive keys connected to the wheels. The notches are trapezoidal in shape such that the thrust of the keys against the driving flanks of the notches is directed inwardly relative to the disk in order to withstand shear forces effectively.

It is conventional to fit metal reinforcing riders onto the portions of the disk between the notches in order to take up the reaction forces from the keys and distribute them over the disk rim between successive notches. These riders are fitted over the rim portions and they are riveted through the thickness thereof.

A first type of rider is constituted by a piece of metal folded into a U-shape with the bottom of the U being curved to completely cover the disk rim between two notches. The ends of this rider are machined so as to lie in the same planes as the drive faces delimiting the rim portion. However, on assembly, it is practically impossible to cause each of the ends to coincide with the plane of the corresponding face. The position of each rider on the disk is determined by its rivets passing through orifices in the sides of the U-shape and through the rim portion of the disk, said orifices being prepared in advance through the parts in locations which can only be determined with reference to these sloping ends or faces. Unfortunately, such determination is degraded by random error by virtue of the sloping nature of the reference faces and the resulting inaccuracies in measurement and in inspection.

This lack of coincidence leads to providing riders in such a manner as to ensure that their end edges always project beyond the flanks of the notches so that the keys bear on the end edges. It should also be underlined that this thrust is always accompanied by the key sliding relative to the disk in the plane of the drive surface, with the sliding being caused by: elastic deformations which cause the wheel to ovalize; deformation of the axle supporting the wheel; misalignment between the axes of the rotor and the stator; . . . . As a result, this first type of assembly gives rise to rapid wear of the end edges of the riders.

A second type of rider provides a solution to this problem which is satisfactory, in part. These riders are stamped metal pieces capping respective corners of the rim portions level with each notch face, with the caps thus covering the drive faces of the rotor disk. Each of these riders is also riveted to the disk and its positioning does not give rise to special difficulties. However this solution increases the number of parts used and therefore complicates manufacture.

The object of the invention is to provide a carbon disk brake rotor fitted with a plurality of one-piece reinforcing riders fitting over the peripheral portions between consecutive notches and additionally covering the drive faces of the notches while nevertheless being easy to put into place by conventional means.

SUMMARY OF THE INVENTION

In order to achieve this object, the present invention provides a carbon disk brake rotor for transmitting a braking couple to a wheel, the rotor including n regularly distributed drive notches hollowed out of its periphery in order to receive keys for providing rotary connection between the rotor and the wheel, each notch being substantially trapezium-shaped and having at least two drive faces disposed symmetrically about the midplane of the notch containing the axis of rotation of the disk, the rotor also having reinforcing riders fitted over the peripheral portions of the disk situated between the notches. The drive faces of each notch form an angle of (360/2n) degrees with the midplane of the corresponding notch, and each rider includes two fitted parallel end walls.

This configuration provides notches on the disk such that the two successive faces of two consecutive notches circumferentially delimiting a rim portion between the notches are mutually parallel. These parallel faces thus constitute accurate reference surfaces whose spacing is easily measured and inspected, and is therefore easily reproduced, thus providing references relative to which the rivet holes can be positioned accurately. The only lack ovf precision that may still exist in the positions of these orifices relates to the distance between said orifices and the periphery of the rim portion or the bottom of the rider, however the parallelism of the end faces makes it possible to accept a large amount of tolerance on this distance.

BRIEF DESCRIPTION OF THE DRAWINGS

An embodiment of the invention is described by way of example with reference to the accompanying drawings, in which.

DETAILED DESCRIPTION

Figure 1:
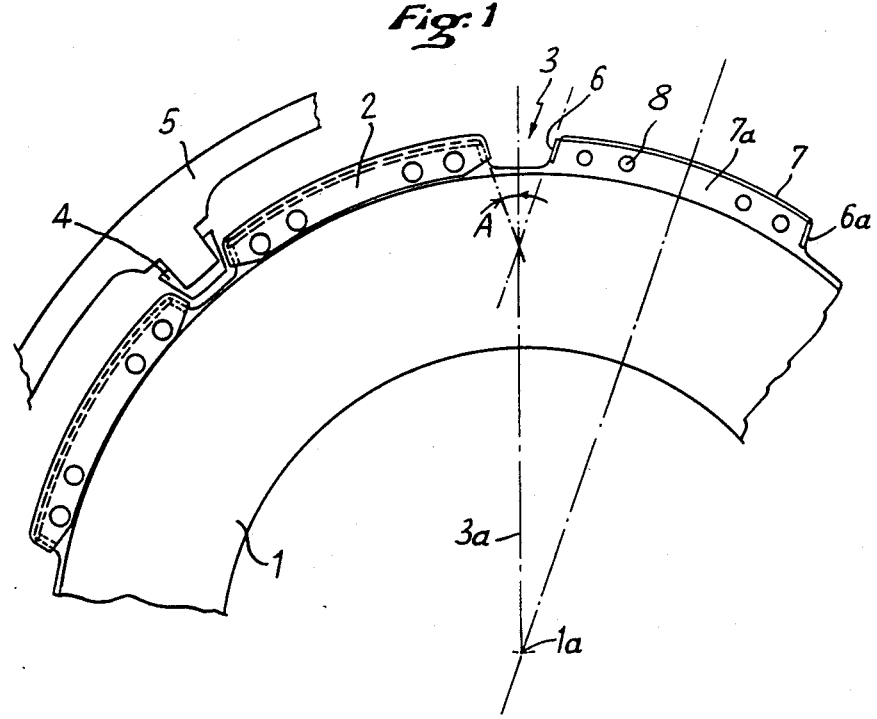
FIG. 1 is a fragmentary view of a carbon disk brake rotor fitted with reinforcing riders, with one of the riders being removed.

With reference initially to FIG. 1, a carbon disk brake rotor 1 is fitted with reinforcing riders 2 as used, in particular, in aircraft brakes. The rotor disk 1 is annular in shape and is provided on its outer periphery with a plurality of drive notches 3 into which drive keys 4 constrained to rotate with the wheel 5 are slidably received. As a result, the wheel 5 and each of its disks 1 are constrained to rotate together and a braking couple can be transmitted to the wheel 5 by applying axial compression to the disks 1 by means of stator disks.

The drive notches 3 are generally trapezium-shaped, each having two drive faces 6 disposed facing each other symmetrically about a midplane 3a for the notch under consideration, said plane containing the axis of rotation 1a of the disk 1. The drive faces 6 extend in a plane perpendicular to the plane of the rotor 1. According to the invention, the drive faces 6 of each notch 3 form an angle A relative to the midplane 3a of the notch equal to (360/2n) degrees where n is the total number of notches 3 around the periphery of the disk 1. Thus, as can be seen clearly from the righthand side of FIG. 1

(from which reinforcing rider 2 has been removed), the two successive drive faces 6 and 6a of two consecutive notches are parallel.

The righthand part of FIG. 1 also shows a projecting rim portion 7 of the disk 1 situated between two consecutive notches. Each of these rim portions 7 includes a plurality of through holes 8 for fixing the reinforcing riders 2 by means of rivets. As can be seen from FIG. 1, the rim portions 7 are capped by reinforcing riders 2 which cover them completely, thereby effectively protecting the drive faces 6 and 6a of the disk 1.

Figure 2:
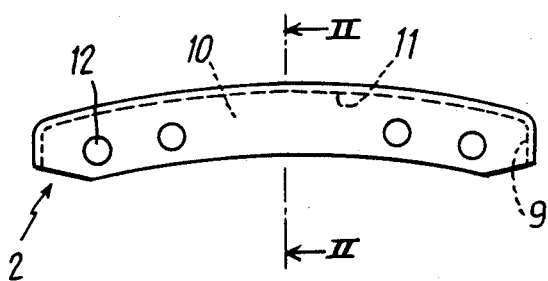
FIG. 2 is a side view of a reinforcing rider as shown in FIG. 1.
Figure 4:
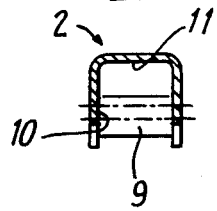
FIG. 4 is a cross section through a reinforcing rider on line II—II of FIG. 2.
Figure 3:
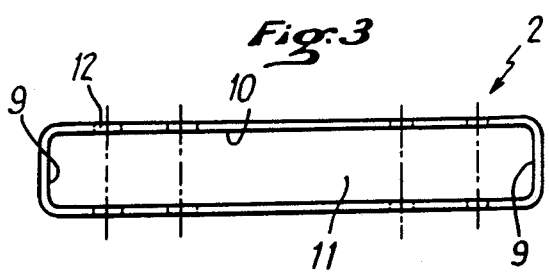
FIG. 3 is a plan view of a reinforcing rider as shown in FIG. 2.

The reinforcing rider 2 of the disk 1 as shown in FIGS. 2 to 4 is generally in the form of an elongate open rectangular box with four fitted sides 9 and 10 which are parallel in pairs and by means of which it is fitted to the disk 1, and a bottom 11 which is slightly curved in order to fit over the periphery of the rim portions 7. The reinforcing riders also include a series of holes 12 through their long walls 10 in order to receive fixing members such as rivets. Since the end walls 9 of the riders are parallel, they can be stamped in a bottomless matrix. Thus, the metal constituting the walls of a rider is pressed between a punch and a matrix, i.e. is formed by an operation which enables accurate dimensions to be obtained. The rider can thus be an accurately fitted to the rim portion 7 of the disk 1 with a good fit along the faces of the notches.

I claim:

1. A carbon disk brake rotor for transmitting a braking couple to a wheel, the rotor including n regularly distributed drive notches hollowed out of its periphery in order to receive keys for providing rotary connection between the rotor and the wheel, each notch being substantially trapezium-shaped and having at least two drive faces disposed symmetrically about the midplane of the notch containing the axis of rotation of the disk, the rotor also having reinforcing riders fitted over the peripheral portions of the disk situated between the notches, wherein the drive faces of each notch form an angle of (360/2n) degrees with the midplane of the corresponding notch, and each rider includes two parallel fitted end walls.

* * * * *